United States Patent
Hexamer

(10) Patent No.: US 8,198,840 B2
(45) Date of Patent: Jun. 12, 2012

(54) METHOD AND DEVICE FOR OPERATING A SYNCHRONOUS MACHINE

(75) Inventor: Bernd Hexamer, Meddersheim (DE)

(73) Assignee: Continental Automotive GmbH, Hannover (DE)

( * ) Notice: Subject to any disclaimer, the term of this patent is extended or adjusted under 35 U.S.C. 154(b) by 575 days.

(21) Appl. No.: 12/278,837

(22) PCT Filed: Jan. 17, 2007

(86) PCT No.: PCT/EP2007/050428
§ 371 (c)(1),
(2), (4) Date: Aug. 8, 2008

(87) PCT Pub. No.: WO2007/090718
PCT Pub. Date: Aug. 16, 2007

(65) Prior Publication Data
US 2009/0206780 A1   Aug. 20, 2009

(30) Foreign Application Priority Data
Feb. 9, 2006 (DE) .................. 10 2006 006 032

(51) Int. Cl.
*H02P 6/00* (2006.01)
*H02P 21/00* (2006.01)
(52) U.S. Cl. ............... 318/400.02; 318/400.01; 318/700
(58) Field of Classification Search ............. 318/400.01, 318/400.02, 700
See application file for complete search history.

(56) References Cited

U.S. PATENT DOCUMENTS

| 5,969,500 | A | 10/1999 | Ishikawa et al. |
| 6,700,400 | B2 * | 3/2004 | Atarashi ................... 318/400.01 |
| 6,812,660 | B2 * | 11/2004 | Takahashi et al. ........ 318/400.02 |
| 6,825,637 | B2 * | 11/2004 | Kinpara et al. ............... 318/700 |
| 6,850,030 | B2 | 2/2005 | Kaku et al. |
| 7,102,314 | B2 * | 9/2006 | Hayashi .................... 318/400.21 |
| 7,233,119 | B2 | 6/2007 | Sieber et al. |
| 7,385,365 | B2 * | 6/2008 | Feick ....................... 318/400.01 |
| 7,437,201 | B2 * | 10/2008 | Cullen ............................ 700/29 |
| 2004/0007995 | A1 * | 1/2004 | Fu ................................ 318/254 |

FOREIGN PATENT DOCUMENTS

| DE | 198 30 133 | 1/1999 |
| DE | 101 06 944 | 9/2002 |
| DE | 102 54 752 | 9/2003 |
| EP | 1 303 035 | 4/2003 |
| EP | 1 411 629 | 4/2004 |
| JP | 2005229717 | 8/2005 |
| WO | WO 2005/025046 | 3/2005 |

OTHER PUBLICATIONS

Leonhard W.; "Control of Electrical Drives"; pp. 309-317; Berlin, Heidelberg, New York; Springer-Verlag; 2; Book; 1996; DE.

(Continued)

*Primary Examiner* — Walter Benson
*Assistant Examiner* — Gabriel Agared
(74) *Attorney, Agent, or Firm* — Cozen O'Connor

(57) ABSTRACT

According to the invention, estimated values ($i_d$ (EST), $i_q$ (EST)) of the motor currents of a synchronous machine are determined by an observer in a co-ordinate system that rotates together with a rotor, independently of the target values ($u_d$, $u_q$) of electric voltages of the synchronous machine (PMSM) in the co-ordinate system that rotates with the rotor.

15 Claims, 5 Drawing Sheets

OTHER PUBLICATIONS

Texas Instruments Europe; "Field orientated control of 3-Phase AC-Motors"; Literature; pp. 1-20 excluding cover, contents, lists of figures; literature No. BPRA 073; Feb. 1998.

Kiyoshi Ohishi, Kouyi Yoshida: "Current sensor-less speed servo system of PM motor based on self-tuning current simulator"; in Electric Machines and Drives Conference, 2003; pp. 1895-1900; IEEE International, vol. 3, Jun. 1-4, 2003; IEMDC '03.

Berendsen, C.-S. et al.: "Detection of sensor faults with observer structures in control loops"; in industrial electronics, control, and instrumentation, 1993. Proceeding of the IE-CON '93; International conference on Nov. 15-19, 1993; pp. 344-348, vol. 1.

German Office Action dated Oct. 10, 2006 issued in corresponding application No. 10 2006 006 032.6.

German Office Action dated Apr. 24, 2008 issued in corresponding application No. 10 2006 006 032.6.

* cited by examiner

$$\frac{di_d}{dt} = \frac{1}{L_d} \cdot \left[ u_d - R_S \cdot i_d + \omega_S \cdot L_q \cdot i_q \right] \quad (F1)$$

$$i_d(t) = i_d(t_0) + \int_{t_0}^{t} \frac{di_d}{dt} \cdot dt = i_d(t_0) + \int_{t_0}^{t} \frac{1}{L_d} \cdot \left[ u_d - R_S \cdot i_d + \omega_S \cdot L_q \cdot i_q \right] \cdot dt \quad (F2)$$

$$\frac{di_q}{dt} = \frac{1}{L_q} \cdot \left[ u_q - R_S \cdot i_q - \omega_S \cdot L_d \cdot i_d - \omega_S \cdot \Psi \right] \quad (F3)$$

Observation Unit

$$i_q(t) = i_q(t_0) + \int_{t_0}^{t} \frac{di_q}{dt} \cdot dt = i_q(t_0) + \int_{t_0}^{t} \frac{1}{L_q} \cdot \left[ u_q - R_S \cdot i_q + \omega_S \cdot L_d \cdot i_d - \omega_S \cdot \Psi \right] \cdot dt \quad (F4)$$

FIG 3

$$\overset{\circ}{i}_d[n] = l_d^{-1}[m] \cdot \left[ u_d[n] - r_S[k] \cdot i_d[n-1] + \omega_S[m] \cdot l_q[m] \cdot i_q[n-1] \right] \quad (F5)$$

$$\overset{\circ}{i}_q[n] = l_q^{-1}[m] \cdot \left[ u_q[n] - r_S[k] \cdot i_q[n-1] - \omega_S[m] \cdot l_d[m] \cdot i_d[n-1] - \omega_S[m] \cdot \Psi[k] \right] \quad (F6)$$

$$i_d[n] = i_d[n-1] + h \cdot \overset{\circ}{i}_d[n] \quad (F7)$$

$$i_q[n] = i_q[n-1] + h \cdot \overset{\circ}{i}_q[n] \quad (F8)$$

$$i_d[n-1] = i_d[n] \quad (F9)$$

$$i_q[n-1] = i_q[n] \quad (F10)$$

$$r_S := r_{ECU}(\vartheta_{ECU}) + r_{MOTOR}(\vartheta_{MOTOR}) \quad (F11)$$

$$\Psi := \Psi(\vartheta_{ROTOR}); \vartheta_{ROTOR}(\vartheta_{MOTOR}) \quad (F12)$$

$$L_d := l_d(i_d) \quad (F13)$$

$$L_q := l_q(i_q) \quad (F14)$$

Observation Unit

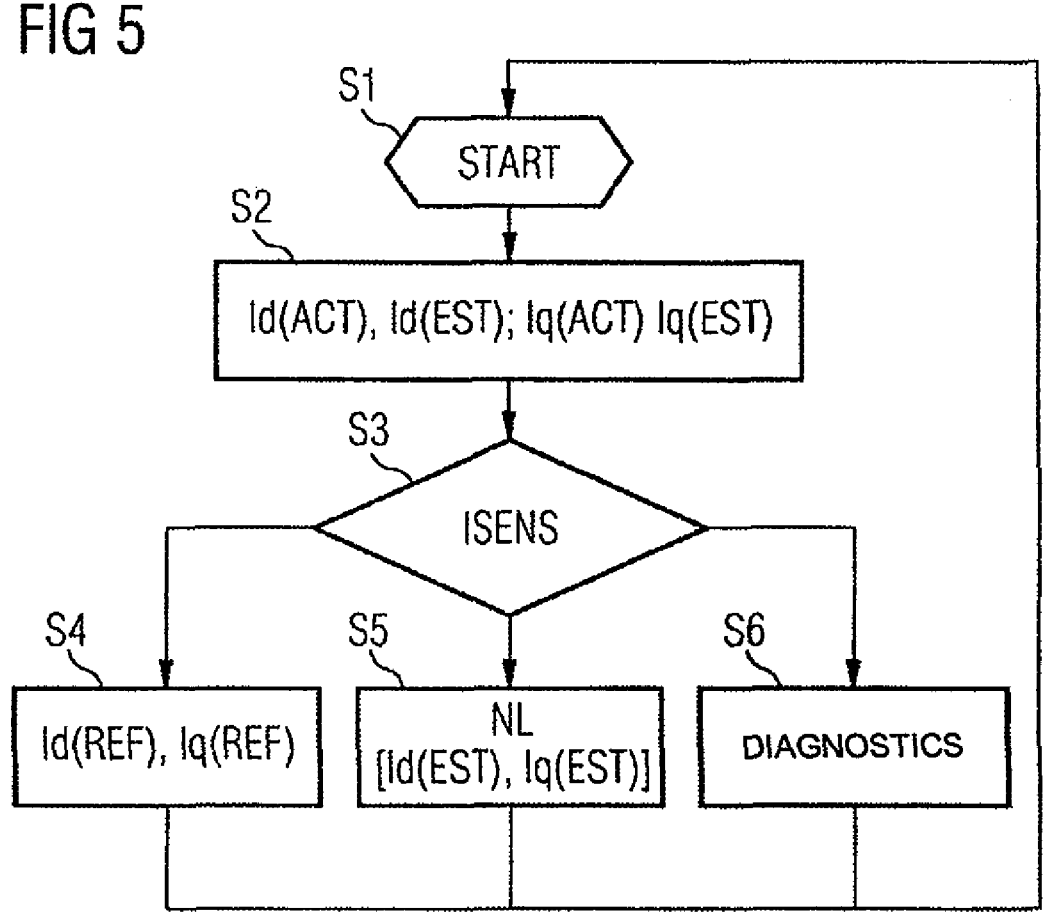

METHOD AND DEVICE FOR OPERATING A SYNCHRONOUS MACHINE

CROSS REFERENCE TO RELATED APPLICATION

This is a U.S. national stage of application No. PCT/EP2007/050428, filed on Jan. 17, 2007. Priority is claimed on German, Application No. 10 2006 006 032.6, filed Feb. 9, 2006, the content of which is incorporated herein by reference.

BACKGROUND OF THE INVENTION

Disclosed is a method and a device for operating a synchronous machine having a stator to which three winding phases are assigned, and a rotor. Synchronous machines are used in the field of automobile engineering where they are used, for example, for steering systems of motor vehicles. Synchronous machines can be equipped with permanent magnets on the rotor. However, they can also be equipped with exciter windings in the rotor. Synchronous machines can be embodied as salient pole machines in which the rotor has a pole wheel with pronounced poles. However, the synchronous machine can also be embodied as a solid pole machine with a rotationally symmetrical rotor.

The publication "Control of Electrical Drives", Leonhard, W., second edition, Berlin, Heidelberg, New York: Springer-Verlag 1996, pages 309 to 317 discloses a controller for a synchronous machine with permanent magnets. The synchronous machine is controlled by a field-oriented control loop. Here, the currents and voltages are transformed into a coordinate system which rotates with the rotor, i.e., a "d,q" coordinate system. The transformation is denoted as a Park transformation. Within this context, the controlled variables are the rotational speed and the rotational angle of the rotor.

In the d,q coordinate system, the d axis coincides with the orientation of the respective poles of the rotor, while the q axis is perpendicular to the d axis so that the d axis is also referred to as a real axis, and the q axis as a virtual axis. In the case of the salient pole machine, the flux mainly forms in the direct axis of the pole wheel due to the pronounced pole located at this position, and the flux therefore utilizes the d,q coordinate system particularly advantageous.

The publication "Field Oriented Control of Three-Phase AC motors", Texas Instruments, BPRA 073, Texas Instruments Europe, 1998, discloses a field-oriented control loop for a synchronous machine. Here, a current sensor system is provided for sensing the conduction currents of the synchronous machine. The sensed conduction currents are transformed by means of a Clarke and Park transformation into the coordinate system which rotates with the rotor, the d,q coordinate system. The transformed d motor currents and q motor currents are then respectively fed to a logic operation point to form a control difference with corresponding setpoint values of the d,q motor currents, and this control difference is then respectively fed to a PI controller. The actuation signal of the respective PI controller is then a respective d or q voltage which is then subject to an inverse Park transformation and fed to a space vector pulse width modulator which acts on a three-phase power inverter in order to generate corresponding conduction currents for the synchronous machine.

SUMMARY OF THE INVENTION

It is an object of the invention is to provide a method and a device for operating a synchronous machine which is simple and precise.

These and other objects and advantages are achieved by a method and a corresponding device for operating a synchronous machine having a stator to which three winding phases are assigned, and a rotor in which estimated values of motor currents of the synchronous machine are determined in a coordinate system, rotating with the rotor, by means of an observer, to be precise as a function of setpoint values of electrical voltages of the synchronous machine in the coordinate system which rotates with the rotor.

The coordinate system which rotates with the rotor can also be referred to as a d,q coordinate system. The invention is characterized by the fact that the synchronous machine can be operated precisely even without costly current sensing of the conductor currents of the synchronous machine. As a result of the fact that the calculations are carried out within the observer in the coordinate system which rotates with the rotor, the estimated values of the motor currents can be determined in a way which is very efficient in terms of computation.

Motor inductances are determined as a function of estimated values of the motor currents in the coordinate system which rotates with the rotor, and the estimated values of the motor currents are determined as a function of the motor inductances. In this way it is easily possible to take into account a non-linear dependence of the motor inductances on the motor currents, and the estimated values of the motor currents can therefore be determined very precisely.

According to one advantageous embodiment, an ohmic equivalent resistance, which is decisive for the operation of the synchronous machine, is determined as a function of the temperature, and the estimated values of the motor currents are determined as a function of the ohmic equivalent resistance. In this way, the estimated values of the motor currents can be determined particularly precisely, to be precise even when temperature fluctuations occur in individual components of the synchronous machine while the synchronous machine is operating.

According to a further advantageous refinement embodiment, a variable which is characteristic of a winding temperature is acquired, and the equivalent resistance is determined as a function of the variable which is characteristic of the winding temperature. Here, the winding temperature is here the respective temperature of the windings in the stator of the synchronous machine. In this way, a temperature dependence of the resistance of the respective winding phases can be taken into account satisfactorily.

In yet a further advantageous embodiment, a variable which is characteristic of a power output stage temperature of a power output stage which is assigned to the synchronous machine for the purpose of operation is acquired, and the equivalent resistance is determined as a function of the variable which is characteristic of the power output stage temperature. This is based on the realization that the resistance of the respective power output stage has a strong temperature dependence, and in particular when MOSFET transistors are used there is a strong non-linear temperature dependence. This therefore also makes a contribution to determining the estimated values of the motor currents very precisely.

According to a further advantageous embodiment, the equivalent resistance is updated with a lower updating rate than the estimated values of the motor currents during operation of the synchronous machine. This makes use of the realization that the temperature does not have such large dynamics and therefore a saving can be made in terms of computational resources.

In still a further advantageous embodiment, a variable which is characteristic of a rotor temperature is determined.

In addition, a linked flux is determined as a function of the variable which is characteristic of the rotor temperature, and the estimated values of the motor currents are determined as a function of the variable which is characteristic of the rotor temperature. This is based on the realization that the linked flux also has a strongly temperature-dependent behavior, in particular if the rotor is equipped with permanent magnets. As a result, it is possible to determine the estimated values of the motor currents particularly precisely while the synchronous machine is operating.

In this context it is advantageous to update the linked flux with a lower updating rate than the estimated values of the motor currents. Here, use is also made of the realization that the temperature does not have such large dynamics and therefore there can be a saving in computational resources.

In a further advantageous embodiment, motor inductances are determined as a function of estimated values of the motor currents in the coordinate system which rotates with the rotor, and the estimated values of the motor currents are determined as a function of the motor inductances. As a result it becomes easy to take into account a non-linear dependence of the motor inductances on the motor currents, and the estimated values of the motor currents can therefore be determined very precisely.

Here, it is also advantageous if the motor inductance is updated with a lower updating rate than the estimated values of the motor currents. Here, use is also made of the realization that the motor inductance is subject to significantly lower dynamics during real operation compared to the updating rate of the estimated values of the motor currents, and there can therefore be a saving in computational resources without losses of precision when the estimated values of the motor currents are determined.

In accordance with an additional advantageous embodiment, the equivalent resistance or the linked flux is determined with a lower updating rate than the motor inductances. This is based on the realization that the equivalent resistance and the linked flux are subject to lower dynamics than the motor inductances, and the computational resources can therefore be used in a very targeted way without appreciable losses of precision in the determination of the estimated values of the motor currents.

In another advantageous embodiment, the equivalent resistance or the linked flux is determined with a lower updating rate than a rotational speed of the rotor in relation to the stator. This is also based on the realization that the rotational speed of the rotor has a higher dynamic than the equivalent resistance or the linked flux, and computational resources can therefore be used in a targeted way with the aim of achieving the most efficient calculation possible without appreciable losses of precision in the determination of the estimated values of the motor currents.

In accordance with a further advantageous embodiment, the estimated values of the motor currents are fed as actual values to regulators whose actuation signals are the setpoint values of the electrical voltages of the synchronous machine in the coordinate system which rotates with the rotor. Consequently, precise and dynamic control of the synchronous machine is possible.

In another advantageous embodiment, measured values of the motor currents are acquired in the conductors of the synchronous machine by of a current sensor system and are transformed into measured values of the motor currents in the coordinate system which rotates with the rotor. In addition, plausibility checking is performed on the measured values with the estimated values, and a diagnostic conclusion is drawn as a function of the plausibility check. This permits simple monitoring when the synchronous machine is operated, and also provides a level of redundancy which can be advantageous in particular with respect to safety aspects.

In accordance with yet another contemplated embodiment, the diagnostic conclusion comprises a conclusion about a failure of the current sensor system. In this way, a failure of the current sensor system can be sensed without an additional sensor system, and measures can advantageously be initiated.

In a further advantageous embodiment, after a failure of the current sensor system has been detected, the synchronous machine is operated in an emergency operating state, specifically independently of the measured values of the motor currents in the coordinate system which rotates with the rotor, and, in return, as a function of the estimated values of the motor currents. This permits a reliable and at the same time comfortable emergency operating mode. In particular, the synchronous machine can be operated precisely in a safe state, and then switched off if appropriate.

In another aspect of the contemplated embodiments, by a computer program product is provided which comprises a computer-readable medium which comprises program instructions which can be executed by means of a processor to execute the method and its advantageous refinements for operating the synchronous machine.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained below by way of example with reference to the schematic drawings, in which:

FIG. 2 is a first block diagram in accordance with an embodiment of an observer for use with the device of FIG. 1, FIG. 3 is a specific refinement of the observer according to FIG. 2, FIG. 5 is a flowchart of a program which is executed in a diagnostic unit while the synchronous machine is operating.

DETAILED DESCRIPTION OF THE PREFERRED EMBODIMENTS

Elements of the same design or function are characterized by the same reference signs in all the figures.

Figure 1:
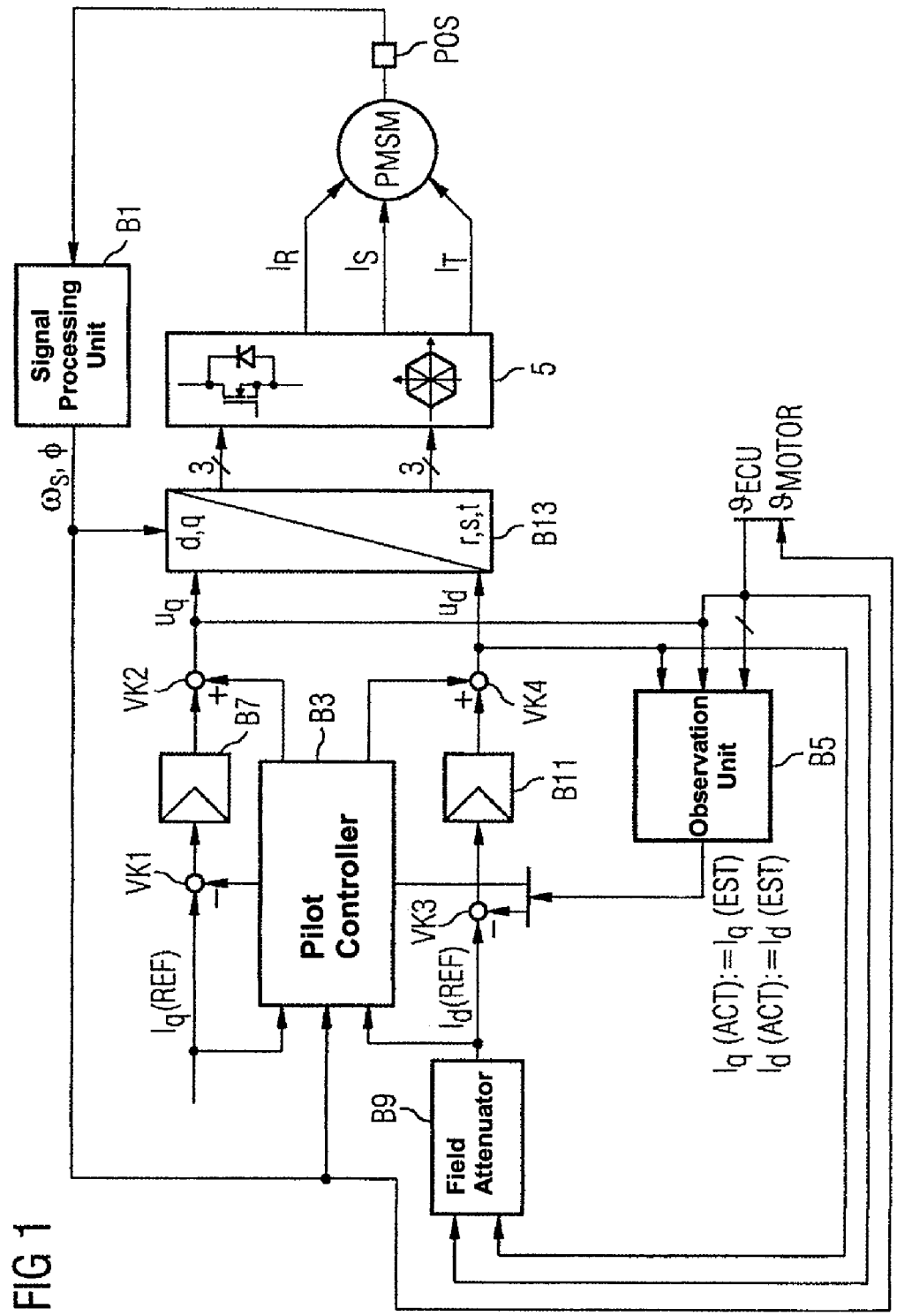
FIG. 1 is a block circuit diagram of a device for operating a synchronous machine.

With reference to FIG. 1, synchronous machine PMSM comprises a stator with three winding phases which are each consequently arranged offset by 120°. The synchronous machine PMSM also comprises a rotor on which permanent magnets are arranged. The rotor having the permanent magnets can be embodied in a rotationally symmetrical (solid pole rotor) fashion or with pronounced poles (salient pole rotor). The stator comprises a three-phase symmetrical winding system.

A position sensor POS is provided by which an angle of the pole wheel can be sensed with respect to a predefined reference mark on the stator. The measurement signal of the position sensor is fed to a block B1 which comprises a signal processing unit, and the rotational angle $\Phi$ and also a rotational speed $\omega_s$ of the rotor in relation to the stator are calculated from the measurement signal of the position sensor.

In one embodiment, the position sensor is a resolver. In another embodiment, the position sensor is an incremental position sensor comprising a Hall element or the like.

A block B3 is provided which comprises a pilot controller and to whose input side the rotational speed $\omega_s$ of the rotor in relation to the stator, the rotational angle $\Phi$ of the rotor in relation to the stator and a setpoint value $i_q(REF)$ of a q motor current and a setpoint value $i_d(REF)$ of the d motor current are fed and which is configured to determine pilot control values.

In the presently contemplated embodiment, d or q motor current is understood to mean motor currents in a coordinate system which rotates with the rotor and which is referred to as a d,q coordinate system.

The setpoint value $i_q(REF)$ of the q motor current is preferably predefined by a different functional unit in the sense of the setting of a desired rotational torque of the synchronous machine PMSM.

A block B5 comprises an observer which is configured to determine estimated values $i_q(EST)$, $i_d(EST)$ of motor currents of the synchronous machine PMSM in a coordinate system which rotates with the rotor. This is preferably performed as a function of setpoint values $u_d$ of a d voltage, setpoint values $u_q$ of a q voltage, a power output stage temperature $\theta_{ECU}$, a winding temperature $\theta_{MOTOR}$ and of the previously determined estimated values $i_q(EST)$, $i_d(EST)$ of the q motor current or of the d motor current.

The more precise configuration of the observer is explained in more detail below with reference to the block circuit diagrams in FIGS. 2 and 3.

With further reference to FIG. 1, a logic operation point VK1 is provided in which a difference is formed between the setpoint value iq(REF) of the q motor current and the estimated value $i_q(EST)$, which forms an actual value $i_q(ACT)$, of the q motor current, wherein this difference is then fed as a control difference to a block B7 which comprises a q controller. In one embodiment, the q controller is a PI controller. At the output end, the q controller generates a corresponding controller value which is then logically combined in a logic operation point VK2 with a corresponding pilot control value of the pilot controller of the block B3 to form the setpoint value $u_q$ of the q voltage.

A block B9 is provided which comprises a field attenuating means, where the current supply voltage of the actuator element S and the setpoint values $u_d$, $u_q$ of the d voltage and of the q voltage are fed to the input side. The output variable of the block B9 is the setpoint value $i_d(REF)$ of the d motor current.

In a logic operation point VK3, a difference is formed between the setpoint value $i_d(REF)$ of the d motor current and an actual value $i_d(ACT)$ of the d motor current as a control difference for a d controller of a block B11. The estimated value $i_d(EST)$ of the d motor current is assigned to the actual value $i_d(ACT)$ of the d motor current.

In accordance with the contemplated embodiments, the d controller is also a PI controller. However, similarly to the contemplated q controller, the d controller may also be any other controller which is known to be suitable for this purpose to a person skilled in the art.

On the output side, the d controller generates a corresponding controller value which is logically combined with a corresponding pilot control value of the pilot controller to form the setpoint value $u_d$ of the d voltage in a logic operation point VK4.

A block B13 comprises a (d,q)/(r,s,t) transformation block which is configured to perform an inverse Park and Clarke transformation and, therefore, perform a corresponding transformation of the q,d coordinate system into corresponding r,s,t coordinates. As a result, block B13 serves to predefine corresponding conductor voltages of the synchronous machine. The d,q coordinate system is defined by the fact that the corresponding transformed motor currents and voltages are invariant over time given knowledge of the precise rotational angle $\Phi$ during steady-state operation of the synchronous machine.

An actuator element S has, as input variables, the output variables of the block B13. The actuator element preferably comprises a space vector pulse width modulator which generates corresponding pulse width-modulated actuation signals for a three-phase power inverter which is also embodied in the actuator element. The three-phase power inverter then supplies the synchronous machine with the desired phase voltages.

The observer B5 (FIG. 2) is configured to solve differential equations F1 to F4 and, in particular, F2 and F4 and to determine estimated values $i_d(EST)$ and $i_q(EST)$ of the motor currents in the d,q coordinate system. The differential equations F1 to F4 are shown in general form without reference to "(EST)" with respect to the motor currents. $t_0$ denotes a starting time of the correspondingly necessary integration. An ohmic equivalent resistance $R_s$, a d motor inductance $L_d$, a q motor inductance $L_q$ are denoted by uppercase letters in the differential equations F1 to F4. They are then correspondingly denoted with lowercase letters $r_s$, $l_d$, $l_q$ if they are respectively newly determined at predefinable sampling intervals.

FIG. 3 shows a preferred implementation of the differential equations F2 and F4 in the block B5, specifically in the form of corresponding differential equations which are predefined, for example, by differential equations F5, F6. In each case, the times of updating of the respective values are represented by the respective term in square brackets. Here, n is used for a maximum updating rate which can be, for example, approximately 100 microseconds. In addition, m represents an average updating rate which can be, for example, approximately 1 millisecond, and k represents a lower updating rate which can be, for example, 10 to 100 milliseconds. Therefore, $i_q[n]$ denotes the respective current value of the respective q motor current while $i_d[n-1]$ denotes the corresponding d motor current which has been determined during the last sampling operation or determining operation. By providing the different sampling rates, computational resources can be used in a targeted fashion, and therefore an overall savings can be made in the deployment of computer resources without significant losses of precision in the determination of the estimated values $i_d(EST)$ and $i_q(EST)$ of the d,q motor currents.

Preferably, the differential equations F5 and F6 are solved by a corresponding differential equation solver, in particular using the first-order Euler method, as is represented on the basis of equations F7 and F8. A factor h is representative of an integration increment and corresponds, in particular, to a processing time period and is identical to the updating rate n.

According to the respectively cyclically occurring solution of the differential equations F5 and F6, the d motor currents and q motor currents are correspondingly updated in accordance with the relationships F9 and F10 using the equations F7 and F8.

In accordance with the contemplated embodiment, ohmic equivalent resistance $r_s$ can be permanently predefined. However, it is preferably determined in accordance with a relationship F11. The power output stage temperature $\theta_{ECU}$ can be acquired, for example, within the actuator element S which comprises the power output stages, by a suitable temperature sensor or else be estimated, if appropriate, by use of a further observer. The winding temperature $\theta_{MOTOR}$ is determined by a suitably arranged temperature sensor. Characteristic curves, which have been determined in advance by trial or simulation, are preferably then stored in the device for operating the synchronous machine to determine output stage resistances $r_{ecu}$ and winding resistances $r_{MOTOR}$. In addition or alternatively, the determination can also be performed computationally in some other way.

A linked flux $\psi$ is preferably also determined as a function of a rotor temperature $\theta_{ROTOR}$ by means of a suitably provided characteristic curve (see F12). The rotor temperature $\theta_{ROTOR}$ is preferably determined as a function of the winding temperature $\theta_{MOTOR}$ by means of a corresponding model which models the relationship between the two variables. Preferably, the model is also determined in advance by corresponding trials or simulations.

The d motor inductance $l_d$ and q motor inductance $l_q$ are preferably determined as a function of the current estimated values $i_d(EST)$, $i_q(EST)$ of the d,q motor current, specifically in accordance with the average sampling rate (see F13, F14). In the pilot control device, the motor inductances can also be determined as a function of the setpoint values $i_d(REF)$, $i_q(REF)$ of the d,q motor current.

Alternatively, all the variables of the differential equations F5, F6 and of the computational rules F7 to F10 can also be respectively newly calculated with the same sampling rate.

Figure 4:
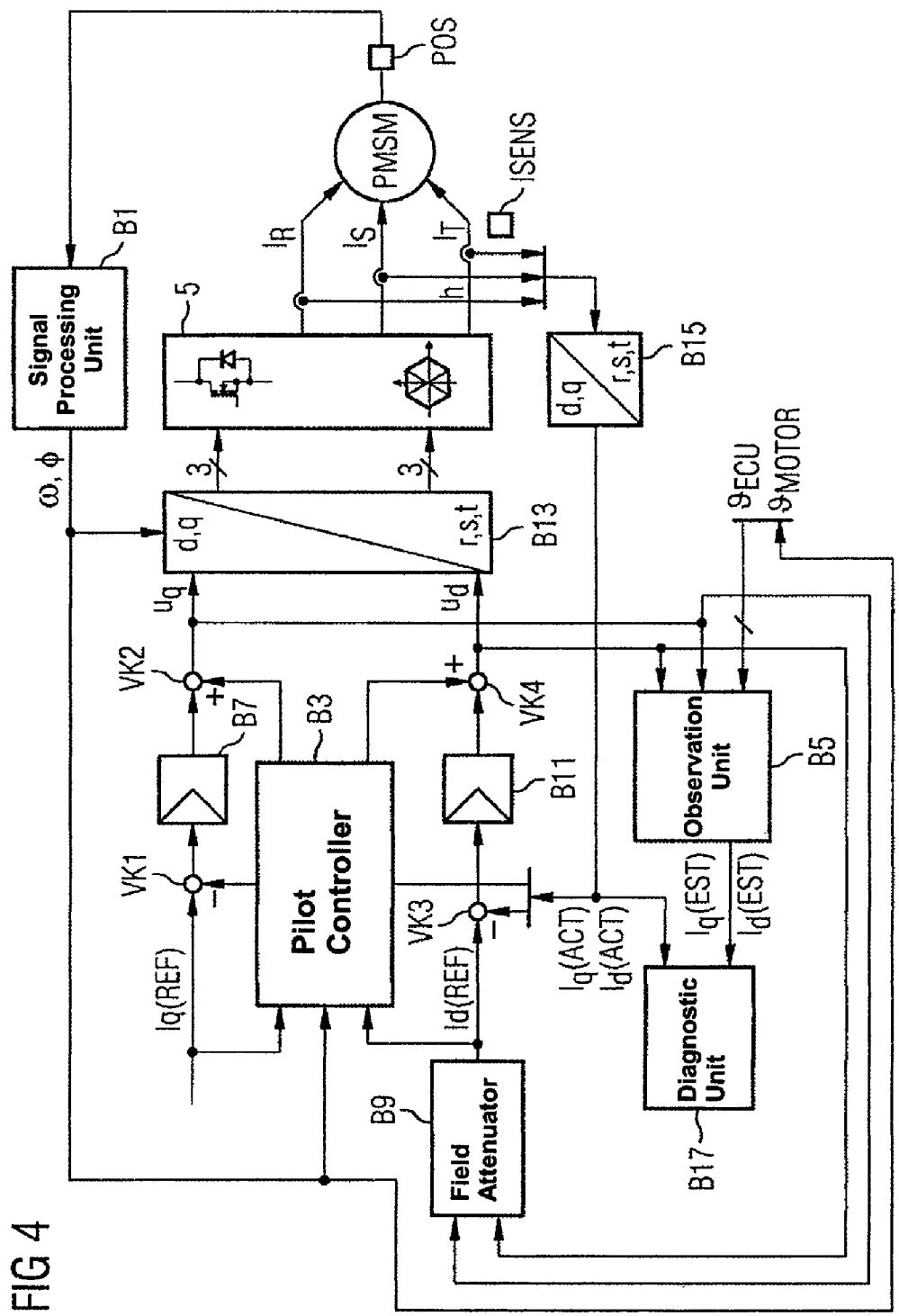
FIG. 4 is a block diagram in accordance with a second embodiment of the device for operating the synchronous machine.

FIG. 4 illustrates another embodiment of the device for operating the synchronous machine PMSM. However, the instant embodiment differs from the first embodiment illustrated in FIG. 1 in that a current sensor system ISENS is provided which senses measured values of the conduction currents of the synchronous machine PMSM and feeds them to a block B15 which comprises a (r,s,t)/(d,q) transformation block of which the values are then transformed into actual values $i_d(ACT)$ of the d motor current and into actual values $i_q(ACT)$ of the q motor current.

In addition, a block B17 is provided which comprises a diagnostic unit. The diagnostic unit is configured to perform plausibility checking on the actual values $i_d(ACT)$, $i_q(ACT)$ of the d or q motor current with the estimated values $i_d(EST)$, $i_q(EST)$ of the d or q motor current, and to derive a diagnostic conclusion therefrom.

In order to derive the diagnostic conclusion, a program is executed in the block B17, where the program is explained in detail with reference to the flowchart in FIG. 5. With specific reference to FIG. 5, the program is started in a step S1 in which, if appropriate, variables are initialized.

In a step S2, the plausibility checking of the actual value $i_d(ACT)$ is performed with the actual value $i_d(EST)$ of the d motor current and/or of the actual value $i_q(ACT)$ and of the estimated value $i_q(EST)$ of the q motor current. Depending on the result of the plausibility checking in step S2, a decision with respect to a diagnostic conclusion is made in step S3. Therefore, for example in the step S3, a failure of the current sensor system is detected if, under certain circumstances, there is an implausible deviation of the comparisons of the corresponding actual values $i_d(ACT)$, $i_q(ACT)$ and estimated values $i_d(EST)$, $i_q(EST)$. In this case, it is possible, for example, to run into a step S5 in which the synchronous machine PMSM is controlled in an emergency operating state. In this emergency operating state, the estimated values $i_d(EST)$ or $i_q(EST)$ of the q or d motor current are preferably applied to the synchronous machine PMSM for the control process in the blocks B7 and B11, and the synchronous machine is preferably placed into a safe state, and then switched off. However, it is then also possible to correspondingly operate the synchronous machine for a relatively long time.

Furthermore, depending on the result of the plausibility checking in step S2 and also in step S3, it is possible to take the decision to branch into a step S4 in which the setpoint value $i_d(REF)$ and/or the setpoint value $i_q(REF)$ is then adapted, if appropriate, as a function of the deviations between the estimated values $i_d(EST)$ and the actual values $i_d(ACT)$ of the d motor currents, or of the deviation between the estimated values $i_q(EST)$ and actual values $i_q(ACT)$. Here it is therefore possible to correct a model error with respect to a temperature behavior of individual components of the synchronous machine PMSM or of the actuator element S. As an alternative to this it is also possible to branch into a step S6 in which further diagnostic conclusions can be drawn or else no diagnostic conclusion can be drawn.

The synchronous machine PMSM can also be, for example, a solid pole machine instead of a salient pole machine, and it can basically also comprise exciter windings instead of the permanent magnet on the pole wheel.

The functionality of the blocks B1 to B15 including the logic operation points VK1 to VK4 or a subset of the latter can also be embodied partially or else entirely in the form of software or hardware or a combination thereof. A corresponding computer program product can be provided on a computer-readable medium with program instructions which can be executed by a computer and which are designed to operate the synchronous machine. The computer-readable medium can be, for example, a CD-ROM, a DVD, a flash memory card, a hard disk or any other suitable computer-readable medium, for example a storage medium in a computer network.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a synchronous machine having a stator with three winding phases assigned to said stator, and a rotor, the method comprising:

determining, by an observation unit, estimated values of motor currents of the synchronous machine in a coordinate system which rotates with the rotor, said step of determining estimated values being performed as a function of setpoint values of electrical voltages of the synchronous machine in the coordinate system which rotates with the rotor and as a function of motor inductances, the setpoint values of the electrical voltages of the synchronous machine being provided to a field attenuator unit which generates a set point value of at least one of the motor currents provided to a controller which determines pilot control values to form the setpoint values of the electrical voltages;

determining the motor inductances as a function of the estimated values of the motor currents to operate the synchronous machine; and determining an ohmic equivalent resistance as a function of temperature;

wherein the step of determining the estimated values of the motor currents is performed as a function of the determined ohmic equivalent resistance.

2. The method as claimed in claim 1, further comprising the step of:

acquiring a variable which is characteristic of a winding temperature;

wherein the step of determining the ohmic equivalent resistance is performed as a function of the variable which is characteristic of the winding temperature.

3. The method as claimed in claim 1, further comprising the step of:

acquiring a variable which is characteristic of a power output stage temperature of a power output stage which is assigned to the synchronous machine for operational purposes;

wherein the step of determining the ohmic equivalent resistance is performed as a function of the variable which is characteristic of the power output stage temperature.

4. The method as claimed in claim 1, further comprising the step of:

updating the ohmic equivalent resistance with a lower updating rate than the estimated values of the motor currents.

5. The method as claimed in claim 1, further comprising the steps of:

determining a variable which is characteristic of a rotor temperature; and determining a linked flux as a function of the variable which is characteristic of the rotor temperature;

wherein the step of determining at least one of the estimated values of the motor currents is performed as a function of the variable which is characteristic of the rotor temperature.

6. The method as claimed in claim 5, further comprising the step of:

updating the linked flux with a lower updating rate than the estimated values of the motor currents.

7. The method as claimed in claim 1, further comprising the step of:

updating the motor inductances with a lower updating rate than the estimated values of the motor currents.

8. The method as claimed in claim 5, further comprising the step of:

determining one of the equivalent resistance and the linked flux with a lower updating rate than the motor inductances.

9. The method as claimed in claim 5, further comprising the step of:

determining one of the equivalent resistance and the linked flux with a lower updating rate than a rotational speed of the rotor in relation to the stator.

10. The method as claimed in claim 1, further comprising the step of:

providing estimated values of the motor currents as actual values to regulators having actuation signals which are setpoint values of the electrical voltages of the synchronous machines in the coordinate system which rotates with the rotor.

11. The method as claimed in claim 1, further comprising the steps of:

transforming measured values of the motor currents, which are acquired in the conductors of the synchronous machine through a current sensor system, into measured values of the motor currents in the coordinate system which rotates with the rotor;

checking the measured values in the coordinate system which rotates with the rotor with the estimated values to determine plausibility of the measured values; and performing a diagnostic conclusion as a function of the plausibility check.

12. The method as claimed in claim 11, wherein the diagnostic conclusion comprises a conclusion about a failure of the current sensor system.

13. The method as claimed in claim 12, further comprising the steps of:

operating the synchronous machine in an emergency operating state after detection of a failure of the current sensor system;

wherein the emergency operating state is performed independently of the measured values of the motor currents in the coordinate system which rotates with the rotor and as a function of the estimated values of the motor currents.

14. A device for operating a synchronous machine, comprising:

a stator to which three winding phases are assigned;

a rotor;

an observation unit configured to determine estimated values of motor currents of the synchronous machine in a coordinate system which rotates with the rotor as a function of setpoint values of electrical voltages of the synchronous machine in the coordinate system which rotates with the rotor, and as a function of motor inductances; and a field attenuator unit configured to receive the setpoint values of the electrical voltages of the synchronous machine and configured to generate a setpoint value of at least one of the motor currents of the synchronous machine;

a controller configured to determine pilot control values to form setpoint values of the electrical voltages;

wherein the observation unit is configured to determine the motor inductances as a function of the estimated values of motor currents; and wherein the determined estimated values of the motor currents are obtained as a function of an ohmic equivalent resistance determined as a function of temperature.

15. A non-transitory computer-readable medium encoded with a computer program executed by a computer which causes operation of a synchronous machine, comprising:

program code for determining, by an observation unit, estimated values of motor currents of the synchronous machine in a coordinate system which rotates with the rotor, said step of determining estimated values being performed as a function of setpoint values of electrical voltages of the synchronous machine in the coordinate system which rotates with the rotor and as a function of motor inductances, the setpoint values of the electrical voltages of the synchronous machine being provided to a field attenuator unit which generates a set point value of at least one of the motor currents provided to a controller which determines pilot control values to form the setpoint values of the electrical voltages;

program code for generating, by a field attenuator unit, a setpoint value of a motor current of the synchronous machine based on the setpoint voltages of the synchronous machine; and program code for determining the motor inductances as a function of the estimated values of the motor currents; and program code for determining an ohmic equivalent resistance as a function of temperature;

wherein the determining the estimated values of the motor currents is performed as a function of the determined ohmic equivalent resistance.

* * * * *